United States Patent
Lhuillier et al.

(10) Patent No.: US 9,643,582 B2
(45) Date of Patent: May 9, 2017

(54) MASTER BRAKE CYLINDER FOR A BRAKING SYSTEM OF A VEHICLE AND METHOD FOR OPERATING A MASTER BRAKE CYLINDER

(75) Inventors: Laurent Lhuillier, Le Blanc Mesnil (FR); Antony Auguste, Villiees/Marne (FR); Bastien Cagnac, Cramoisy (FR); Takeshi Kaneko, Suitawa (JP); Tim Albert, Niles, MI (US); Matthias Kistner, Bretzfeld (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/347,517

(22) PCT Filed: Aug. 8, 2012

(86) PCT No.: PCT/EP2012/065506
§ 371 (c)(1),
(2), (4) Date: Dec. 15, 2014

(87) PCT Pub. No.: WO2013/045161
PCT Pub. Date: Apr. 4, 2013

(65) Prior Publication Data
US 2015/0158475 A1 Jun. 11, 2015

(30) Foreign Application Priority Data
Sep. 30, 2011 (DE) .................. 10 2011 083 896

(51) Int. Cl.
*B60T 13/14* (2006.01)
*B60T 11/16* (2006.01)
(Continued)

(52) U.S. Cl.
CPC ............ *B60T 13/145* (2013.01); *B60T 11/16* (2013.01); *B60T 13/686* (2013.01); *B60T 13/745* (2013.01)

(58) Field of Classification Search
CPC ...... B60T 11/16; B60T 13/145; B60T 13/745; B60T 13/686
(Continued)

(56) References Cited

U.S. PATENT DOCUMENTS 5,609,399 A * 3/1997 Feigel ................... B60T 8/3265
188/162
5,970,710 A * 10/1999 Dieringer ............... B60T 8/441
60/575
(Continued)

FOREIGN PATENT DOCUMENTS

CN 101636301 A 1/2010
FR 2 961 460 12/2011
(Continued)

OTHER PUBLICATIONS

Machine translation in English for JP 10-67309A, Inventor:Nakano; 7 pages; Retrieve Date: Jun. 29, 2016.*
(Continued)

*Primary Examiner* — Thomas J Williams
*Assistant Examiner* — Mariano Sy
(74) *Attorney, Agent, or Firm* — Gerard Messina

(57) ABSTRACT

A master brake cylinder for a braking system of a vehicle has: a first filling volume, which is fillable with liquid, and whose first dimension is variable by adjusting at least one first piston wall; a second filling volume, which is fillable with liquid, and whose dimension is variable by adjusting at least one second piston wall; and a valve unit, the first filling volume being connected via the valve unit to the second filling volume in such a way that when the valve unit is switched into a first valve state, a joint first pressure chamber pressure prevails in the first filling volume and in the second filling volume.

29 Claims, 6 Drawing Sheets

(51) Int. Cl.
*B60T 13/68* (2006.01)
*B60T 13/74* (2006.01)

(58) Field of Classification Search
USPC ............... 303/114.1; 60/575, 591; 188/358
See application file for complete search history.

(56) References Cited

U.S. PATENT DOCUMENTS

| | | | |
|---|---|---|---|
| 6,226,993 B1 * | 5/2001 | Heibel | B60T 7/042 |
| | | | 60/547.3 |
| 6,363,720 B1 * | 4/2002 | Nakano | B60T 7/042 |
| | | | 60/574 |
| 2009/0058181 A1 | 3/2009 | Suzuki et al. | |

FOREIGN PATENT DOCUMENTS

| | | | |
|---|---|---|---|
| GB | 2 348 685 | | 10/2000 |
| JP | 57 147952 | | 9/1982 |
| JP | 10067309 A | * | 3/1998 |
| WO | WO 2009/121645 | | 5/2009 |

OTHER PUBLICATIONS

International Search Report for PCT/EP2012/065506, dated Mar. 8, 2013.

\* cited by examiner

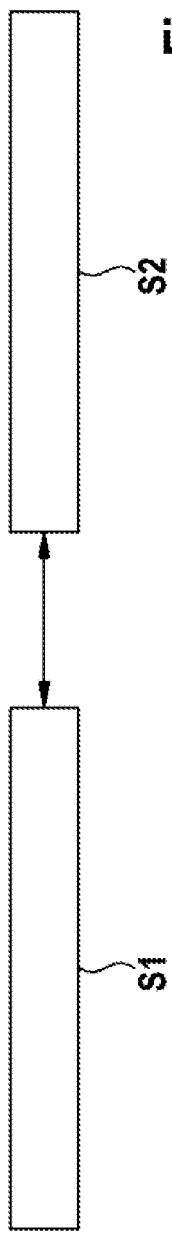

MASTER BRAKE CYLINDER FOR A BRAKING SYSTEM OF A VEHICLE AND METHOD FOR OPERATING A MASTER BRAKE CYLINDER

BACKGROUND OF THE INVENTION

1. Field of the Invention

The present invention relates to a master brake cylinder for a braking system of a vehicle, to a power booster for a braking system of a vehicle, and to a method for operating a master brake cylinder.

2. Description of the Related Art

A hydraulic vehicle braking system is described in published international patent application document WO 2009/121645 A1. The master brake cylinder of the hydraulic vehicle braking system includes a first pressure chamber and a second pressure chamber. In addition, the master brake cylinder has an integrated pedal travel simulator 22 on an end which widens toward the brake pedal, the volume which is fillable with brake fluid being hydraulically connected via a simulator valve to a brake fluid reservoir. The volume of the pedal travel simulator fillable with brake fluid and the adjacent first pressure chamber are delimited by a rod and simulator piston designed as a stepped piston.

BRIEF SUMMARY OF THE INVENTION

The present invention makes possible a master brake cylinder, whose first pressure chamber in a first operating mode of the master brake cylinder may include at least one first filling volume and one second filling volume, each of the two filling volumes being variable in its size via an adjustment of the piston wall associated therewith. The master brake cylinder is also operable in a second operating mode, however, in which the first pressure chamber includes at least the first filling volume, while a reservoir pressure, in particular the atmospheric pressure, is present in the second filling volume. This may also be described as optional connection and disconnection of the second filling volume. Therefore, the first pressure chamber of the advantageous master brake cylinder may be variably fixed in its size via the connection and disconnection of the second filling volume, in addition to an adjustment of the piston walls delimiting the filling volume.

As explained in greater detail hereafter, by disconnecting the second filling volume, or setting the reservoir pressure in the second filling volume, the brake application in the first pressure chamber of the master brake cylinder may be boosted. Therefore, as a result of the reduction of the available volume of the first pressure chamber at a predefined braking force (driver braking force), an increased brake pressure results. This may also be referred to as an increase of the brake application force-brake pressure transmission ratio by reduction of the brake application volume of the first pressure chamber.

The present invention therefore allows a changeover of the hydraulic transmission ratio (brake application force and pressure transmission ratio), with the aid of which, in the event of a failure of a brake force booster device, an amplified pressure buildup in the brake application volume of the pressure chamber is achievable using a given pedal force. In this way, a higher level of deceleration for rapid braking of a vehicle may be caused using a comparatively low driver brake force. For example, by disconnecting the second filling volume, in spite of a failure of the brake force booster device, at least a deceleration of 2.44 m/s² may be achieved at a driver brake force (pedal force) of 500 N. With the aid of the present invention, the master brake cylinder may additionally be designed without consideration of the deceleration which is still achievable in the event of a failure of the brake force booster device. In spite of the ability to connect and disconnect the second filling volume, an advantageous brake operation feeling (pedal feeling) and good volume management of the master brake cylinder are still ensured.

Another advantage of the present invention is that a deceleration of at least 6.44 m/s² at a driver braking force of 500 N may also be achieved when the ignition key is withdrawn for a variety of vehicles on the market. The deceleration may also be achieved in the case of a "sleeping" braking system (without awakening, which is no longer necessary). With the aid of the present invention, the complexity of many electrical brake force boosters and the systems equipped therewith is additionally reducible.

The present invention may be housed in a simple way as an additional component in a (hydraulic) braking system. The present invention provides an advantageous electrically or mechanically switchable fallback level in the event of a functional impairment of a brake force booster device, for example, in the event of a failure of the brake force booster device. However, it is to be noted that the usability of the present invention is not only restricted to the compensation of the functional impairment of the brake force booster device.

BRIEF DESCRIPTION OF THE DRAWINGS

FIG. 6 shows a flow chart to illustrate one specific embodiment of the method for operating a master brake cylinder.

DETAILED DESCRIPTION OF THE INVENTION

Figure 1:
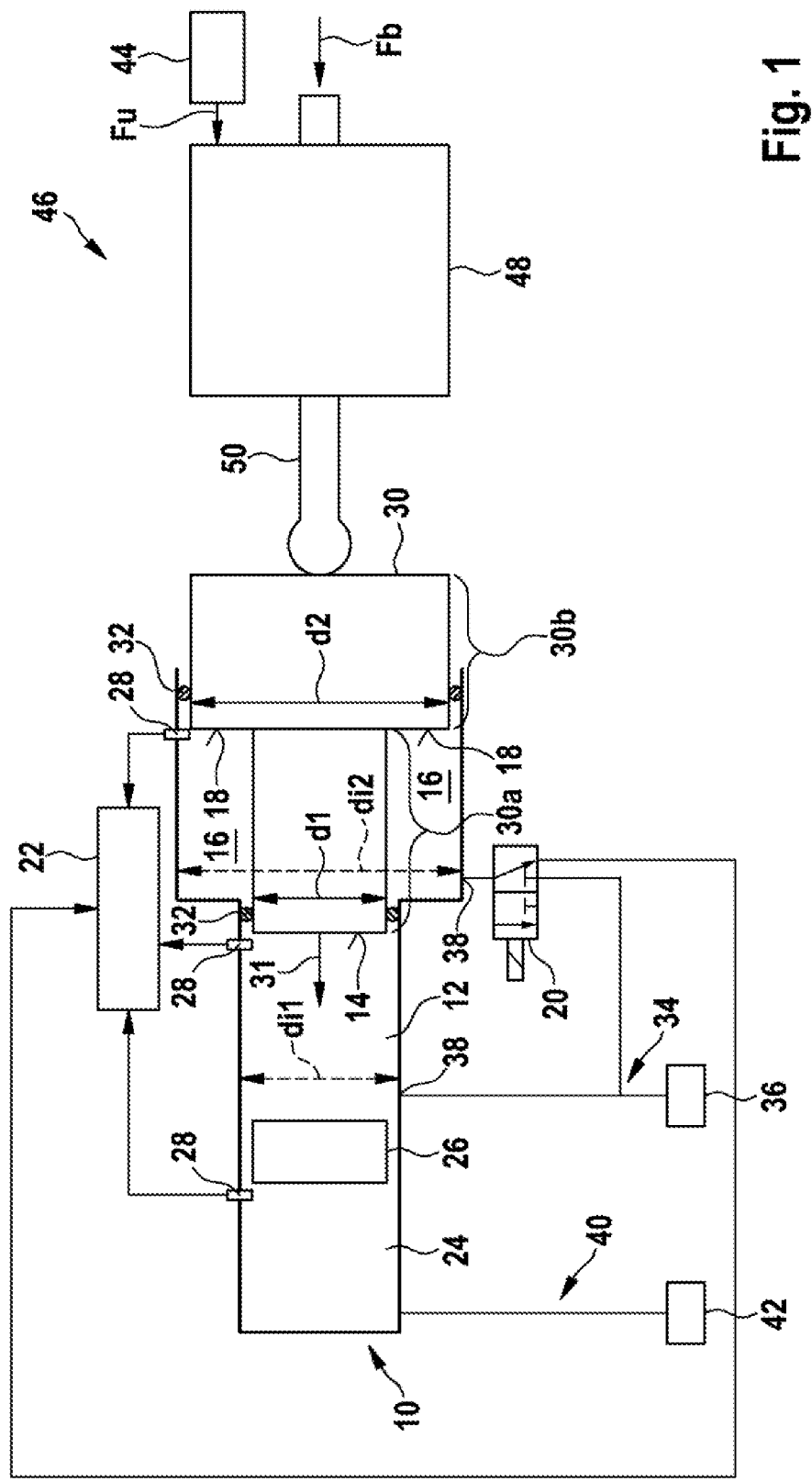
FIG. 1 shows a schematic view of a first specific embodiment of the master brake cylinder.

FIG. 1 shows a schematic view of a first specific embodiment of the master brake cylinder.

Master brake cylinder 10, which is schematically shown in FIG. 1, is usable in a braking system of a vehicle. Master brake cylinder 10 has a first filling volume 12, which is fillable with liquid, and whose first dimension is variable by adjusting at least one first piston wall 14. In addition, master brake cylinder 10 has a second filling volume 16, which is fillable with liquid, and whose second dimension is also variable by adjusting at least one second piston wall 18. First filling volume 12 is (hydraulically) connected via a valve unit 20 to second filling volume 16 in such a way that when switching valve unit 20 into a first valve state, a joint first pressure chamber pressure is present in first filling volume 12 (as a first internal pressure) and in second filling volume 16 (as a second internal pressure).

Second filling volume 16 may be connected to a brake fluid reservoir 22/may be connectable to brake fluid reservoir 22 via valve unit 20 in such a way that when switching valve unit 20 into a second valve state, a reservoir pressure provided in brake fluid reservoir 22 is present in second filling volume 16. When switching valve unit 20 into the second valve state, in this case a first internal pressure which deviates from the reservoir pressure may be introduced in first filling volume 12. The reservoir pressure of brake fluid reservoir 22 may be the atmospheric pressure in particular.

Master brake cylinder 10 therefore has a first pressure chamber, which, when switching valve unit 20 into the first valve state, includes at least first filling volume 12 and second filling volume 16. In contrast, when switching valve unit 20 into the second valve state, the first pressure chamber of master brake cylinder 10 includes at least first filling volume 12, a first internal pressure, which deviates from the reservoir pressure (which is present in second filling volume 16), being able to be introduced into first filling volume 12 (with the aid of the adjustment of first piston wall 14).

Switching valve unit 20 into the first valve state or into the second valve state therefore causes a connection or disconnection of second filling volume 16 to or from the first pressure chamber of master brake cylinder 10. The volume of the first pressure chamber may be fixed/varied independently of a position/location of piston walls 14 and 18 by this connection or disconnection of second filling volume 16. This may also be referred to as fixing the brake application volume of the first pressure chamber, if valve unit 20 is present in the first valve state, the brake application volume of the first pressure chamber (at least) including the two filling volumes 12 and 16, while if valve unit 20 is present in the second valve state, the brake application volume of the first pressure chamber is separated from second filling volume 16.

A brake force application-brake pressure transmission ratio (at least of the first pressure chamber) may be increased with respect to a transmission ratio of a brake force exerted on first piston wall 14, which delimits first filling volume 12, into a brake pressure built up in the first pressure chamber by the disconnection of second filling volume 16, or the separation of the brake application volume of the first pressure chamber from second filling volume 16. Therefore, after the disconnection of second filling volume 16, a comparatively large brake pressure may already be built up with the aid of a relatively low brake force exerted on first piston wall 14. The deceleration resulting from the brake force/brake application force may thus be increased by the disconnection of second filling volume 16. For example, a functional impairment of a brake force booster may be able to be compensated for by the increase of the brake application force-brake pressure transmission ratio (at least of the first pressure chamber). However, the usage of master brake cylinder 10 described here is not limited to the compensation for a failure of a brake force booster.

Optionally, master brake cylinder 10 may also have a second pressure chamber 24, into which a floating piston part 26 is adjustable at least partially in such a way that a second brake pressure prevailing in second pressure chamber 24 is variable. However, it is to be noted that the implementability of master brake cylinder 10 described here is not restricted to a tandem master brake cylinder. Therefore, master brake cylinder 10 may also only include one single (first) pressure chamber, whose brake application volume is fixable/variable with the aid of valve unit 20.

Brake fluid reservoir 22, to which second filling volume 16 is connectable/is connected via valve unit 20, may be a central brake fluid reservoir 22, for example, to which first filling volume 12, second filling volume 16, and/or second pressure chamber 24 are each hydraulically connected via an orifice bore 28. A second brake fluid reservoir 22 may also be used for optionally setting the reservoir pressure in second filling volume 16.

Piston walls 14 and 18, which delimit first filling volume 12 and second filling volume 16, may be formed on a shared piston part 30 in one advantageous specific embodiment. Shared piston part 30 is preferably implemented in this case as a stepped piston. Piston part 30 may have, on an inner end oriented toward a center of master brake cylinder 10, a first piston section 30a having a first diameter d1 perpendicular to an adjustment direction 31 of piston part 30, which is smaller than a second diameter d2 perpendicular to adjustment direction 31 of a second piston section 30b, which is adjacent to first piston section 30a, of piston part 30.

Between first piston section 30a of piston part 30, which is designed as a stepped piston, and an adjacent wall of master brake cylinder 10, a sealing element 32 may be situated, for example, a sealing ring and/or a lip seal. In this way, an undesirable liquid exchange between the two filling volumes 12 and 16 along piston part 30, which is implemented as a stepped piston, is preventable. Alternatively or additionally thereto, liquid may be prevented from seeping out of master brake cylinder 10 via a sealing element 32, which is situated between second piston section 30b and the adjacent wall of master brake cylinder 10, and which may also be a sealing ring and/or a lip seal.

Preferably, if piston part 30 is implemented as a stepped piston, the shape of filling volumes 12 and 16 is adapted to the stepped piston. For example, a first internal diameter di1 of first filling volume 12, which is aligned perpendicularly to adjustment direction 31 of piston part 30, may correspond to first diameter d1 of first piston section 30a and twice the ring thickness of sealing element 32, and/or a second internal diameter di2 of second filling volume 16, which is aligned perpendicularly to adjustment direction 31, may correspond to second diameter d2 of second piston part 30 and twice the ring thickness of sealing element 32.

However, it is to be noted that the implementation of piston walls 14 and 18, which delimit filling volumes 12 and 16, on a shared piston part 30 is only optional. First piston wall 14 may also be implemented on a first piston (not shown), which is adjustable independently of a second piston (not shown), which is implemented separately therefrom, having second piston wall 18.

The shape of master brake cylinder 10 may also be selected with a high degree of design freedom. The implementation of two different internal diameters di1 and di2 on master brake cylinder 10 is therefore only to be interpreted as an example.

Valve unit 20 may be implemented directly on master brake cylinder 10 in a line/hydraulic connection which connects the two filling volumes 12 and 16. As an alternative thereto, however, valve unit 20 may also be a component of a brake circuit 34, via which the two filling volumes 12 and 16 are each connected via one supply opening 38 to at least one wheel brake caliper 36. However, if a hydraulic connection is implemented between the two filling volumes 12 and 16 on master brake cylinder 10, the implementation of a supply opening 38 for connecting one of the two filling volumes 16 to first brake circuit 34 may be omitted.

It is to be noted that the usability of master brake cylinder 10 described here is not limited to a braking system having a specific number of brake circuits 34 and 40 or a predefined number of wheel brake calipers 36 and 42. Instead, the number of brake circuits 34 and 40 and wheel brake calipers 36 and 42 may be adapted to the intended use of the braking system.

In one advantageous specific embodiment, valve unit 20 is implemented in such a way that it is present in the second valve state when it is deenergized, while valve unit 20 may be switched from the second valve state into the first valve state via energization. This may also be described in such a way as to say that valve unit 20 may be switched via energization into the first valve state and via an interruption of the energization into the second valve state. Valve unit 20 is thus controllable in a simple way.

Master brake cylinder 10 may be operated together with a brake force booster device 46 in a power booster/braking system. An actuator unit 44 of brake force booster device 46 is preferably designed in this case for the purpose of exerting a brake assistance force Fu on a booster body 48 of brake force booster device 46 in such a way that, with the aid of the adjustment of booster body 48, brake assistance force Fu is transmittable onto the at least one piston of piston walls 14 and 18. In this way, in addition to driver brake force Fb, which is transmitted via a connecting rod 50 from a brake actuation element (not shown), the brakes may also be applied in master brake cylinder 10 using brake assistance force Fu. This causes relief of the driver during braking of his vehicle.

Preferably, valve unit 20, which is present in the second valve state when it is deenergized, may be incorporated in a shared power circuit (not shown) with actuator unit 44 of brake force booster device 46. In this case, it is ensured that in the event of an impairment of the power supply of actuator unit 44, valve unit 20 may (automatically) be switched into the second valve state. This causes an (automatic) disconnection of second filling volume 16, or an (automatic) separation of second filling volume 16 from the first pressure chamber in the event of an impairment of the power supply of actuator unit 44. In this way, the brake application force-brake pressure transmission ratio may be (automatically) increased with respect to a transmission ratio of a brake force exerted on first piston wall 14, which delimits first filling volume 12, into a brake pressure built up in the first pressure chamber.

Alternatively or additionally to an incorporation of valve unit 20 in a shared power circuit with actuator unit 44, the power supply of valve orientation 20, which is present in the second valve state when deenergized, may also be interrupted if brake assistance force Fu is discontinued or in the event of a functional impairment of brake force booster device 46. This causes the above-described high brake application force-brake pressure transmission ratio of the first pressure chamber of master brake cylinder 10. The driver may thus already still cause a sufficiently high brake pressure in the at least one wheel brake cylinder 36 and 42 with a comparatively small driver brake force Fp.

Figure 2:
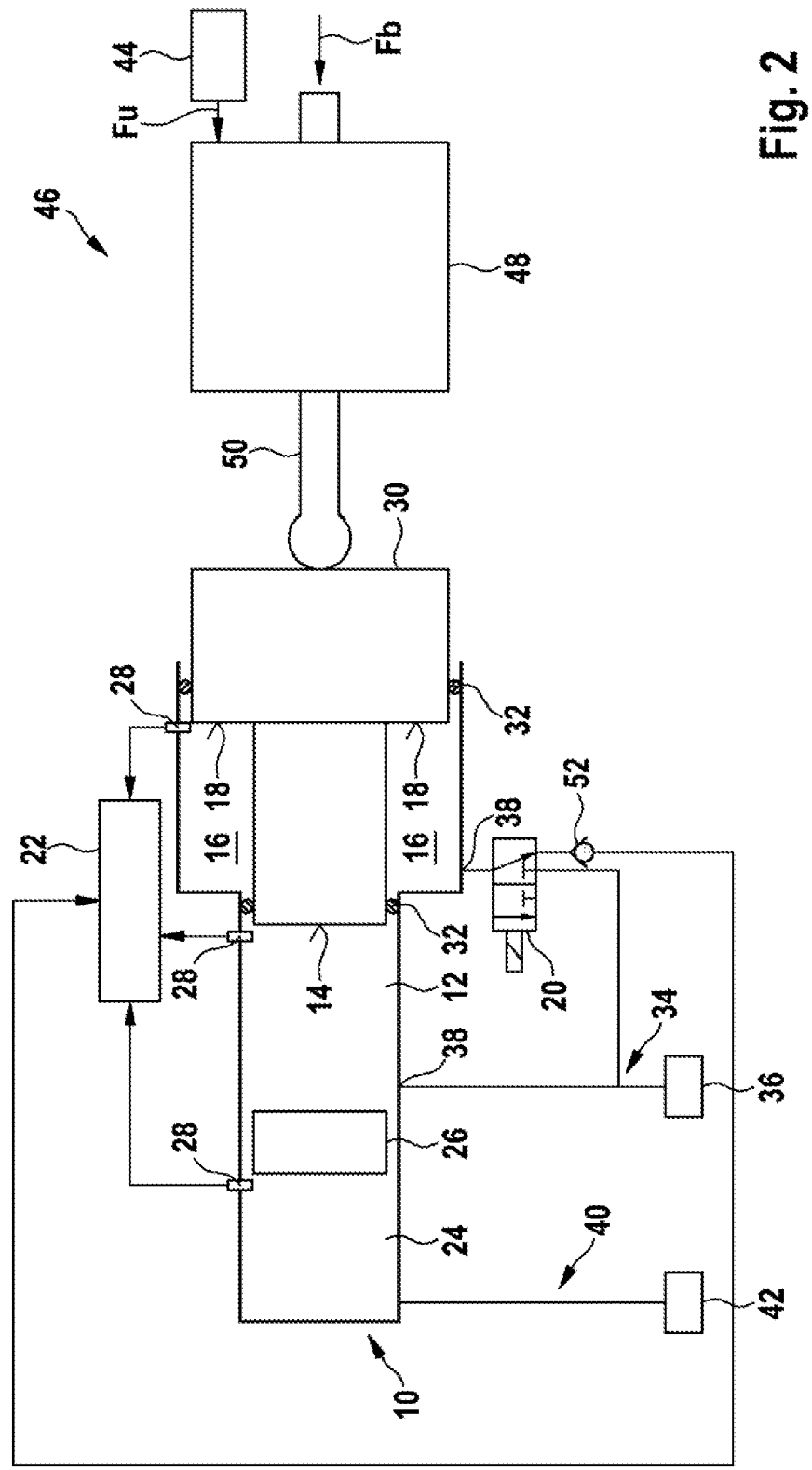
FIG. 2 shows a schematic view of a second specific embodiment of the master brake cylinder.

FIG. 2 shows a schematic view of a second specific embodiment of the master brake cylinder.

The power booster/braking system which is schematically shown in FIG. 2, or master brake cylinder 10 contained therein, has, in addition to the above-described components, a pressure-relief valve 52, via which valve unit 20 is hydraulically connected to brake fluid reservoir 22. Pressure-relief valve 52 is oriented in such a way that a liquid displacement from brake fluid reservoir 22 via pressure-relief valve 52 to valve unit 20 is suppressed even at a comparatively high pressure, while pressure-relief valve 52 opens on the outlet side from valve unit 20 in the event of a relatively high pressure.

Second filling volume 16 may be used in backup mode during a beginning of a brake operation with the aid of pressure-relief valve 52. In this way, the brake application volume may be additionally increased. A deceleration achievable using a maximum pedal travel may also be increased.

Figure 3B:
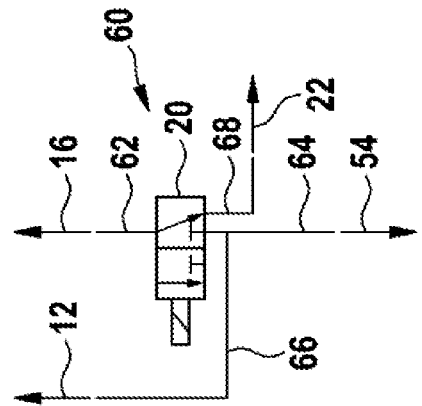
FIGS. 3a and 3b show a schematic overall view and an enlarged partial view of one specific embodiment of the braking system.
Figure 3A:
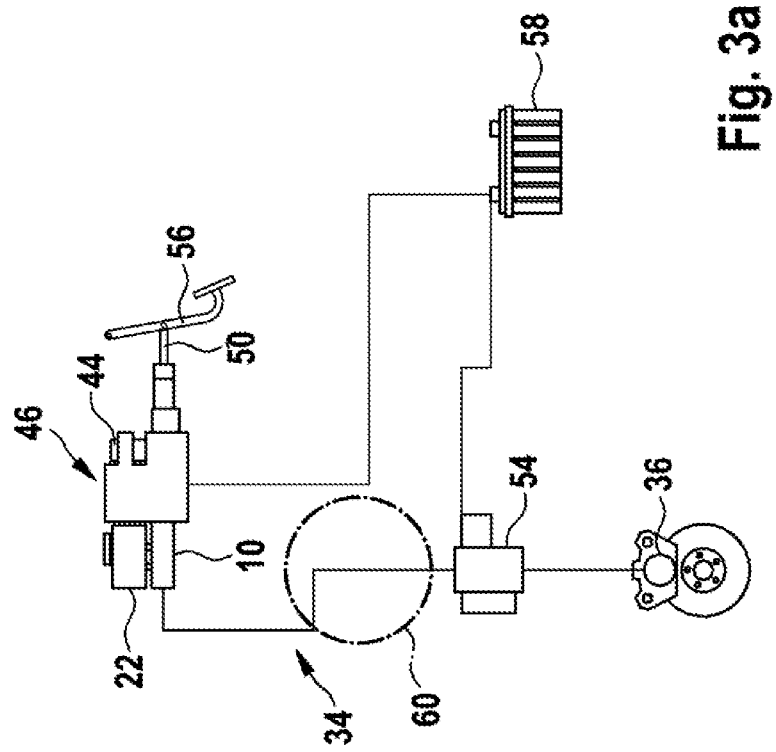

FIGS. 3a and 3b show a schematic overall view and an enlarged partial view of one specific embodiment of the braking system.

The braking system which is schematically shown in FIG. 3a has master brake cylinder 10, brake fluid reservoir 22, at least one brake circuit 34 having at least one wheel brake caliper 36, brake force booster device 46, and an ESP device 54. A brake operating element 56, for example, a brake pedal, is situated on connecting rod 50 of brake force booster device 46. In addition, a vehicle battery 58 is schematically shown in FIG. 3a, with the aid of which actuator unit 44 of brake force booster device 46 and ESP device 54 may be supplied with power. A section 60 of schematically shown brake circuit 34, which is located between master brake cylinder 10 and ESP device 54, is shown enlarged in FIG. 3b.

As is apparent from FIG. 3b, valve unit 20 may also be situated spaced apart from master brake cylinder 10 in the at least one brake circuit 34. For example, valve unit 20 may be situated between a first line 62, which leads to second filling volume 16, and a second line 64, which leads to ESP device 54. A third line 66, which connects first filling volume 12 to ESP device 54, may open into second line 64. Valve unit 20 may be connected to brake fluid reservoir 22 via a fourth line 68 (only partially shown). An additional reservoir may also be connected to fourth line 68.

A failure of brake force booster device 46 may still be compensated for with the aid of a disconnection of second filling volume 16 from the first pressure chamber if valve unit 20 is situated spaced apart from master brake cylinder 10, in such a way that with the aid of a comparatively small brake application force applied as a driver brake force Fb, a sufficiently high brake pressure may still be caused in the first pressure chamber, which is separated from second filling volume 16.

It is to be noted that a component which is already conventionally present in the braking system, for example, at least one valve of ESP device 54, may (also) be used for valve unit 20. Valve unit 20 may also additionally be used by ESP device 54. Manufacturing costs may be reduced by this multifunctional implementability of valve unit 20.

In addition, a standard/conventional master brake cylinder 10 may also be used for the advantageous braking system having an optionally settable brake application volume of the first pressure chamber. A more cost-effective master brake cylinder is also usable to implement the braking system shown in FIGS. 3a and 3b.

Figure 4:
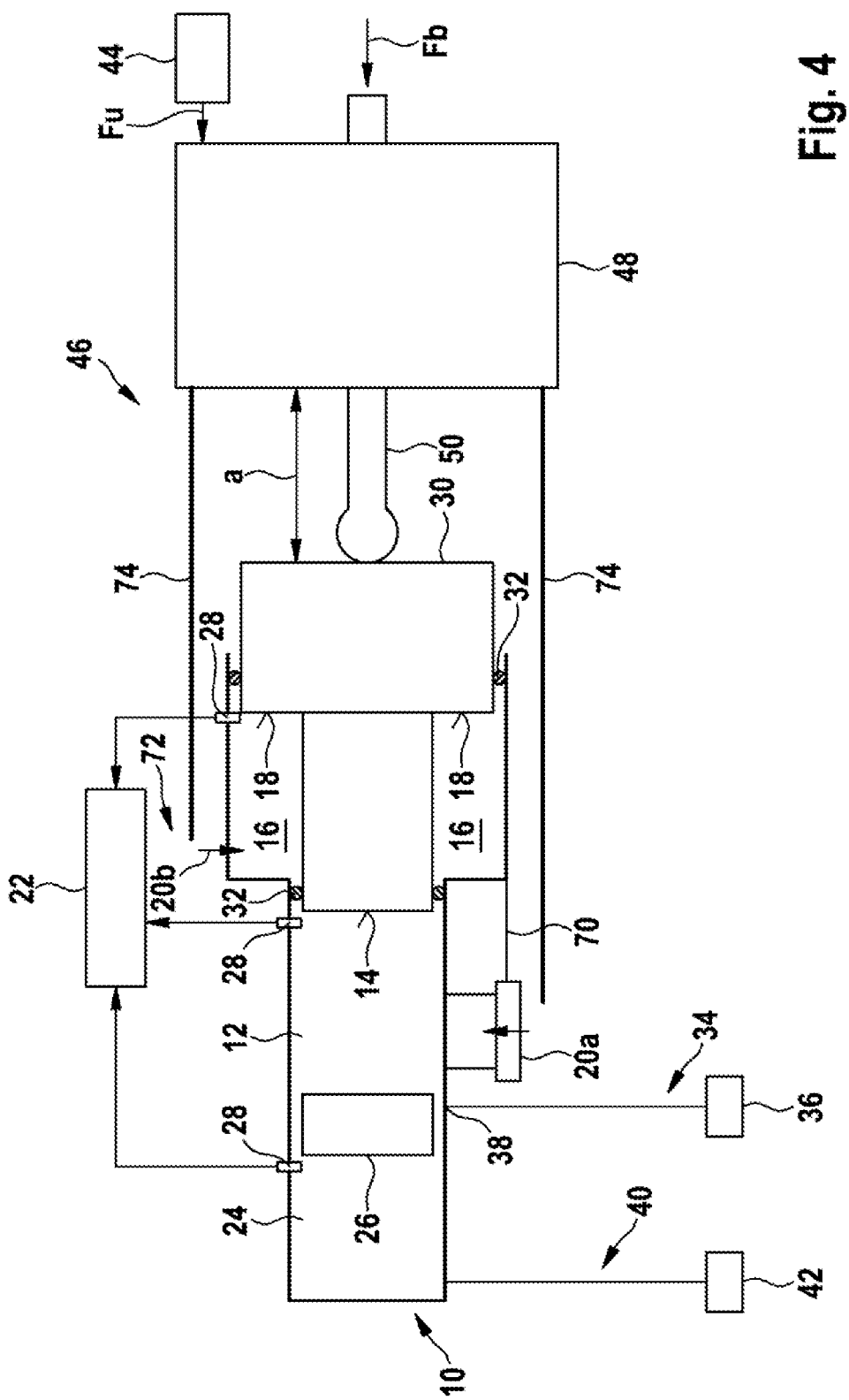
FIG. 4 shows a schematic view of a first specific embodiment of the power booster.

FIG. 4 shows a schematic view of a first specific embodiment of the power booster.

The power booster which is schematically shown in FIG. 4 is usable in a braking system of a vehicle. The power booster has master brake cylinder 10 and brake force booster device 46 having the above-described components. The power booster may optionally also include a brake fluid reservoir 22.

In the power booster which is schematically shown in FIG. 4, valve unit 20a and 20b is situated on/connected to booster body 48 of brake force booster device 46 in such a way that valve unit 20a and 20b is mechanically switchable with the aid of booster body 48 at least from the first valve state into the second valve state. Optionally, valve unit 20a and 20b may also be mechanically switchable with the aid of booster body 48 from the second valve state into the first valve state. Booster body 48 may be understood as a component of brake force booster device 46 which is adjustable with the aid of brake assistance force Fu provided by actuator unit 44 of brake force booster device 46. Actuator unit 44 may include a hydraulic or electromechanical unit, for example. The transmission of brake assistance force Fu from actuator unit 44 to booster body 48 may be carried out via at least one intermediate component. Additionally or alternatively thereto, the switching of valve unit 20a and 20b at least from the first valve state into the second valve state by booster body 48 may also be carried out via at least one intermediate component.

For example, for switching valve unit 20a and 20b at least from the first valve state, booster body 48 is situated on valve unit 20a and 20b in such a way that if booster body 48 is present in a starting position, valve unit 20a and 20b is present in the second valve state, while an adjustment of booster body 48 out of the starting position by a minimum adjustment distance causes the switch of valve unit 20a and 20b from the second valve state into the first valve state.

The starting position of booster body 48 is preferably a position in this case in which booster body 48 is present in the case of a driver brake force Fb equal to zero and/or a brake assistance force Fu equal to zero.

In this way, in the event of a functional impairment of brake force booster device 46, which generally causes/triggers a presence of booster body 48 in its starting position (in spite of a driver brake force not equal to zero), (automatic) switching of valve unit 20a and 20b into the second valve state may be caused. The mechanical switching ability of valve unit 20a and 20b into the second valve state with the aid of keeping booster body 46 in its starting position therefore (automatically) causes an advantageously small brake application volume of the first pressure chamber if brake assistance force Fu is discontinued.

In contrast, in the event of an adjustment of booster body 48 from its starting position, which is generally to be attributed to the (full) functionality of brake force booster device 46, the (automatic) presence of valve unit 20a and 20b in the first valve state is ensured. If the functionality of brake force booster device 46 is ensured, the first pressure chamber therefore (automatically) has an advantageously large brake application volume.

Valve unit 20a and 20b may be associated with at least one pressure exertion component 74 of booster body 48. In this case, adjusting booster body 48 from its starting position may also cause an adjustment of the at least one pressure exertion component 74. By way of the co-adjustment of the at least one pressure exertion component 74, a mechanical pressure/a mechanical force may be exerted on at least one switching mechanism (not shown) of valve unit 20a and 20b in such a way that the at least one switching mechanism (not shown) of valve unit 20a and 20b is mechanically switched.

The advantageous mode of operation of mechanically switchable valve unit 20a and 20b may also be described to say that booster body 48, if it is also moved in parallel to piston part 30, i.e., at a uniform distance a (equal to the minimum distance) to piston part 30, is present in the first valve state. In contrast, a diminishing pressure and/or force exertion on valve unit 20a and 20b by the at least one pressure exertion component 74 causes switching of valve unit 20a and 20b into the second valve state.

In the specific embodiment schematically shown in FIG. 4, valve unit 20a and 20b includes two mechanically switchable valve units 20a and 20b. A first valve unit 20a is situated in a hydraulic connection 70 between first filling volume 12 and second filling volume 16. A second valve unit 20b is implemented in a further hydraulic connection 72 between second filling volume 16 and brake fluid reservoir 22. Each of the two valve units 20a and 20b is associated with one pressure exertion component 74 of booster body 48.

In particular, the first valve state of valve unit 20a and 20b, which is formed from valve units 20a and 20b, may be defined by the fact that first valve unit 20a is present in a first flow state, while second valve unit 20b is present in a second blocking state. In addition, in the second valve state, first valve unit 20a may be present in a first blocking state and second valve unit 20b may be present in a second flow state. In this case, with the aid of the adjustment of booster body 48 from its starting position and the co-adjustment of the at least one pressure exertion component 74, first valve unit 20a may be mechanically switchable into the first blocking state and second valve unit 20b may be mechanically switchable into the second flow state. The co-movement of booster body 48 in parallel to piston part 30 (distance a equal to the minimum distance) switches first valve unit 20a from the first flow state into the first blocking state and second valve unit 20b from the second blocking state into the second flow state. In contrast, a diminishing pressure exertion on the two valve units 20a and 20b (distance a greater than the minimum distance) causes switching back of first valve unit 20a from the first blocking state into the first flow state and second valve unit 20b from the second flow state into the second blocking state.

However, it is to be noted that the mechanically switchable implementation of valve unit 20a and 20b is not limited to the equipment thereof with two valve subunits 20a and 20b which are separate from one another.

Figure 5:
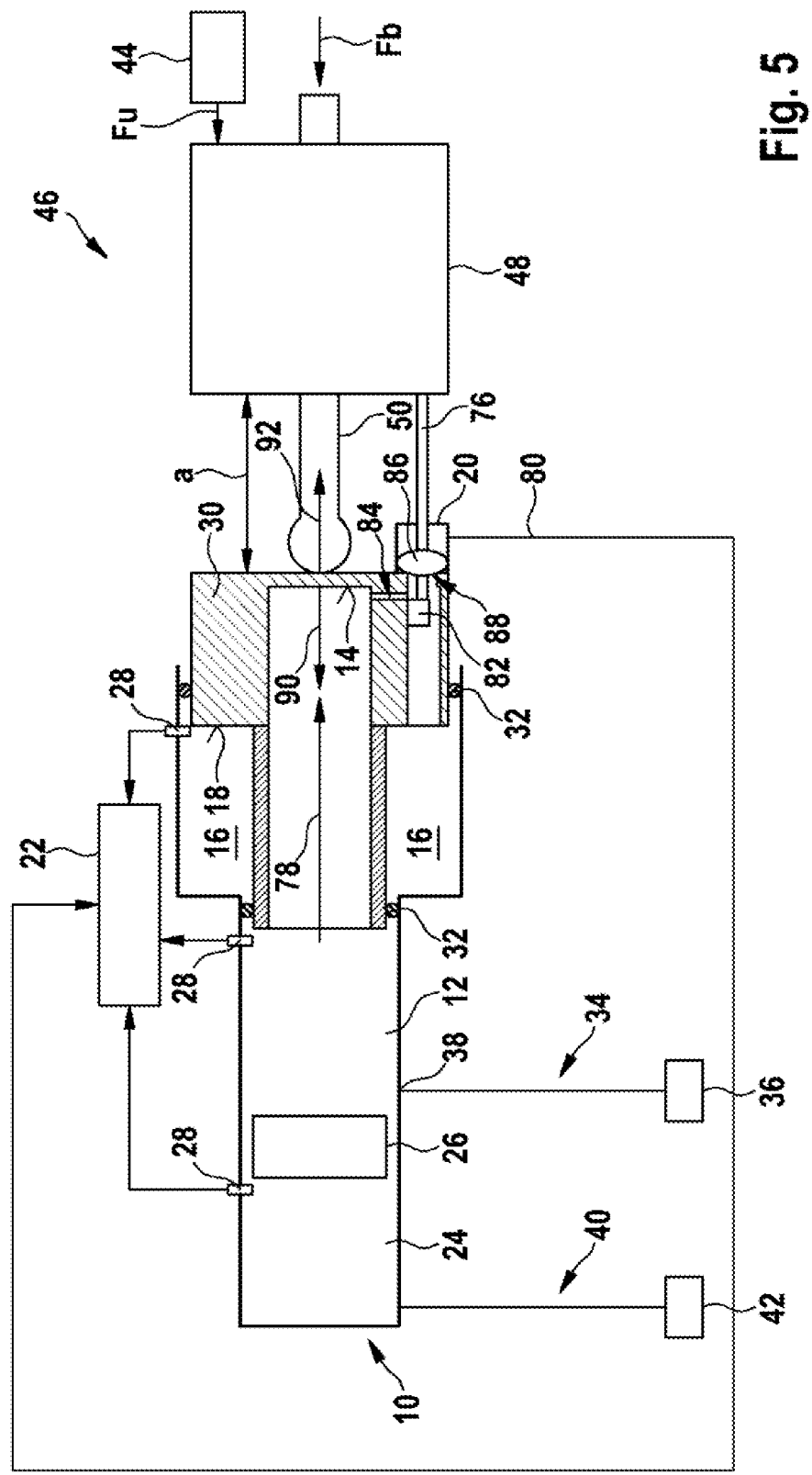
FIG. 5 shows a schematic view of a second specific embodiment of the power booster.

FIG. 5 shows a schematic view of a second specific embodiment of the power booster.

The power booster which is schematically shown in FIG. 5 has a valve unit 20, which is adjustable at least partially with piston part 30 and is connected via a connecting component 76 to booster body 48 in such a way that valve unit 20 is mechanically switchable at least between the first valve state and the second valve state with the aid of a relative movement of booster body 48 in relation to piston part 30. For this purpose, valve unit 20 has a housing component implemented so it is adjustable with piston part 30. Connecting component 76 may be connected/integrally implemented in particular with at least one adjustable blocking component of valve unit 20.

In the specific embodiment shown, at least one flow opening 78 is implemented in piston part 30, which connects first filling volume 12 to second filling volume 16. A hydraulic connection 80 of brake fluid reservoir 22 to second filling volume 16 may also open into flow opening 78. Optionally, valve unit 20 has a first valve body 82, which seals a taper 84 of flow opening 78 in a first blocking position, while if first valve body 82 is present in a first flow position, a liquid transfer is ensured between the two filling volumes 12 and 16 via flow opening 78. In addition, valve unit 20 may have a second valve body 86, which, in a second blocking position, seals a discharge opening 88 of hydraulic connection 80 of brake fluid reservoir 22 to second filling volume 16, while if second valve body 86 is present in a second flow position, a liquid transfer may be carried out through discharge opening 88 between second filling volume 16 and brake fluid reservoir 22.

First valve body 82 and second valve body 86 may abut in such a way that, in the event of a relative movement of booster body 48 in relation to piston part 30, they carry out a joint adjustment movement in relation to piston part 30 (with constant distance to one another). A joint adjustment movement of the two valve bodies 82 and 86 in relation to piston part 30 in a counter pressure direction 92 oriented opposite to a brake application direction 90 of piston part 30 preferably causes an adjustment of first valve body 82 from its first flow position into the first blocking position and an adjustment of second valve body 86 from its second blocking position into its second flow position. Correspondingly, a joint adjustment movement of the two valve bodies 82 and 86 in relation to piston part 30 in brake application direction 90 may cause an adjustment of first valve body 82 from its first blocking position into its first flow position and an adjustment of second valve body 86 from its second flow position into its second blocking position. In this case, it is ensured that if booster body 48 also moves in parallel to piston part 30, first valve body 82 is present in its first flow position and second valve body 86 is present in its second blocking position. This may also be described to say that if a minimal distance a is maintained between piston part 30 and booster body 48, valve unit 20 is present in the first valve state as a result of the first flow position of first valve body 82 and the second blocking position of second valve body 86. Since the ability to also adjust booster body 48 at minimum distance a to piston part 30 is generally only ensured in the case of provided functionality of brake force booster device 46, the presence of valve unit 20 in the first valve state, which is preferred in this situation, is reliably implemented.

In contrast, distance a generally increases in the case of a driver braking force Fb not equal to zero and a functional impairment of brake force booster device 46. This causes the above-described adjustment movement of the two valve bodies 82 and 86 in relation to piston part 30 in counter pressure direction 92 as a result of their connection to booster body 48 via connecting component 76. Therefore, first valve body 82 is shifted as a result of the functional impairment of brake force booster device 46 from its flow position into its first blocking position, while second valve body 86 is similarly adjusted from its second blocking position into its second flow position. This causes the above-described advantageous reduction of the brake application volume of the first pressure chamber of master brake cylinder 10 to first filling volume 12, or the separation/disconnection of second filling volume 16.

Although the present invention is described in the above paragraphs on the basis of master brake cylinder 10, whose piston part 30 (primary piston) acts on two independent volumes/filling volumes 12 and 16, the present invention is not restricted to such a design of master brake cylinder 10. Instead, the present invention also includes differently implemented master brake cylinders 10, whose volumes may act in combination or separately on a brake circuit with the aid of valve unit 20.

If valve unit 20 is designed as an additional valve, standard master brake cylinders 10 may also be used to implement the present invention. An implementation of the present invention by switching over one mechanical valve or multiple mechanical valves is also possible.

FIG. 6 shows a flow chart to illustrate one specific embodiment of the method for operating a master brake cylinder.

The method described hereafter is practicable, for example, with the aid of one of the above-described specific embodiments. However, the practicability of the method described here is not limited to the use of the specific embodiments.

In a method step S1, a dimension of a pressure chamber of a master brake cylinder is fixed to at least one first filling volume, which is fillable with liquid, of the master brake cylinder, whose first dimension is variable by adjusting at least one first piston wall, and to a second filling volume, which is fillable with liquid, of the master brake cylinder, whose second dimension is variable by adjusting at least one second piston wall. This takes place by releasing a first hydraulic connection between the first filling volume and the second filling volume and suppressing a second hydraulic connection between the second filling volume and a brake fluid reservoir. Method step S1 may be carried out by a valve unit implemented in one piece or by a valve unit made of multiple valve subunits implemented separately from one another.

In a further method step S2, the dimension of the pressure chamber is fixed at least to the first filling volume fillable with the liquid, while simultaneously the second internal pressure prevailing in the second filling volume is set to the reservoir pressure (atmospheric pressure). This is carried out by suppressing the first hydraulic connection between the first filling volume and the second filling volume and releasing the second hydraulic connection between the second filling volume and the brake fluid reservoir.

The above-described method is not limited to a carrying out of method steps S1 and S2 in the specified sequence. Instead, the method step may also be carried out before method step S1. Method steps S1 and S2 may also be repeated as often as desired.

The above-described advantages may be caused by carrying out the method. A repeated description of these advantages will be omitted here.

What is claimed is:

1. A master brake cylinder for a braking system of a vehicle, comprising:
   a first filling volume for filling with liquid, wherein at least one dimension of the first filling volume is variable by adjusting at least one first piston wall;
   a second filling volume for filling with liquid, wherein at least one dimension of the second filling volume is variable by adjusting at least one second piston wall; and
   a valve unit, wherein the first filling volume is connected via the valve unit to the second filling volume in such a way that (i) when the valve unit is switched into a first valve state, a shared pressure chamber pressure prevails in the first filling volume and in the second filling volume, and a brake application volume of a pressure chamber of the master brake cylinder includes at least the first filling volume and the second filling volume, to produce a first ratio of brake pressure provided by the pressure chamber to brake force exerted on at least one piston having the at least one first and second piston walls, and (ii) when the valve unit is switched into a second valve state, the brake application volume of the pressure chamber of the master brake cylinder includes at least the first filling volume and is separated from the second filling volume, to produce a second ratio of the brake pressure to the brake force, the second ratio being greater than the first ratio, wherein the valve unit is switched into the second valve state in response to a failure of a brake force booster device.

2. The master brake cylinder as recited in claim 1, wherein the second filling volume is connected via the valve unit to a brake fluid reservoir in such a way that when the valve unit is switched into the second valve state, (i) a reservoir pressure prevailing in the brake fluid reservoir is present in the second filling volume, and (ii) a first internal pressure which deviates from the reservoir pressure is introduced into the first filling volume.

3. The master brake cylinder as recited in claim 2, wherein the master brake cylinder has a second pressure chamber, and wherein a floating piston part is inserted into the second pressure chamber at a variable depth to vary a second pressure chamber pressure which prevails in the second pressure chamber.

4. The master brake cylinder as recited in claim 2, wherein the valve unit is switched into the first valve state in response to the valve unit being energized, and the valve unit is switched into the second valve state in response to the valve unit being deenergized.

5. The master brake cylinder as recited in claim 1, wherein the at least one first and second piston walls face in a substantially same direction.

6. The master brake cylinder as recited in claim 1, wherein the at least one piston is a single piston having the at least one first and second piston walls.

7. The master brake cylinder as recited in claim 6, wherein the single piston is a stepped piston having a first piston section having a first diameter perpendicular to an adjustment direction of the piston and a second piston section having a second diameter perpendicular to the adjustment direction, the first diameter being smaller than the second diameter.

8. The master brake cylinder as recited in claim 1, wherein the at least one piston includes a first piston having the at least one first piston wall and a second piston having the at least one second piston wall.

9. The master brake cylinder as recited in claim 1, wherein the first filing volume is delineated by a first cylinder wall having a first diameter and the second filling volume is delineated by a second cylinder wall having a second diameter, the first diameter being smaller than the second diameter.

10. The master brake cylinder as recited in claim 1, wherein the valve unit is switched into the first valve state in response to the valve unit being energized, and the valve unit is switched into the second valve state in response to the valve unit being deenergized.

11. The master brake cylinder as recited in claim 1, further comprising a sealing element to prevent passage of the liquid in the second filing volume to the first filing volume other than through the valve unit.

12. The master brake cylinder as recited in claim 1, wherein the second filling volume is connected via the valve unit to a brake fluid reservoir in such a way that, when the valve unit is switched into the second valve state, a reservoir pressure prevailing in the brake fluid reservoir is present in the second filling volume.

13. A power booster for a braking system of a vehicle, comprising:
a master brake cylinder including:
a first filling volume for filling with liquid, wherein at least one dimension of the first filling volume is variable by adjusting at least one first piston wall;
a second filling volume for filling with liquid, wherein at least one dimension of the second filling volume is variable by adjusting at least one second piston wall; and
a valve unit, wherein the first filling volume is connected via the valve unit to the second filling volume in such a way that (i) when the valve unit is switched into a first valve state, a shared pressure chamber pressure prevails in the first filling volume and in the second filling volume, and a brake application volume of a pressure chamber of the master brake cylinder includes at least the first filling volume and the second filling volume, to produce a first ratio of brake pressure provided by the pressure chamber to brake force exerted on at least one piston having the at least one first and second piston walls, and (ii) when the valve unit is switched into a second valve state, the brake application volume of the pressure chamber of the master brake cylinder includes at least the first filling volume and is separated from the second filling volume, to produce a second ratio of the brake pressure to the brake force, the second ratio being greater than the first ratio, wherein the valve unit is switched into the second valve state in response to a failure of a brake force booster device; and
the brake force booster device.

14. The power booster as recited in claim 13, wherein:
the valve unit is switched into the first valve state in response to the valve unit being energized;
the valve unit is switched into the second valve state in response to the valve unit being deenergized; and
the energization of the valve unit and energization of an actuator unit of the brake force booster device, via which a brake assistance force is provided, is carried out via a shared power circuit.

15. The power booster as recited in claim 13, wherein the valve unit is situated on a booster body of the brake force booster device which is adjustable with the aid of the brake assistance force provided by the actuator unit of the brake force booster device, the valve unit being mechanically switchable with the aid of the booster body at least from the first valve state into the second valve state.

16. The power booster as recited in claim 15, wherein, with the aid of at least one pressure exertion component of the booster body of the brake force booster device, a mechanical force is exerted on at least one switching mechanism of the valve unit to mechanically switch the at least one switching mechanism of the valve unit.

17. The power booster as recited in claim 15, wherein the valve unit has a housing component configured to be adjustable with a piston part of the master brake cylinder, and at least one adjustable blocking component of the valve unit is connected via a connecting component to the booster body of the brake force booster device.

18. The power booster as recited in claim 13, wherein the valve unit is switched into the first valve state in response to the valve unit being energized, and wherein the valve unit is switched into the second valve state in response to the valve unit being deenergized.

19. The power booster as recited in claim 13, wherein the at least one first and second piston walls face in a substantially same direction.

20. The power booster as recited in claim 13, wherein the at least one piston is a single stepped piston having a first piston section having a first diameter perpendicular to an adjustment direction of the piston and a second piston section having a second diameter perpendicular to the adjustment direction, the first diameter being smaller than the second diameter.

21. The power booster as recited in claim 13, wherein the at least one piston includes a first piston having the at least one first piston wall and a second piston having the at least one second piston wall.

22. A braking system for a vehicle, comprising:
at least one brake circuit;
a brake force booster device; and
a master brake cylinder including:
a first filling volume for filling with liquid, wherein at least one dimension of the first filling volume is variable by adjusting at least one first piston wall;
a second filling volume for filling with liquid, wherein at least one dimension of the second filling volume is variable by adjusting at least one second piston wall; and
a valve unit, wherein the first filling volume is connected via the valve unit to the second filling volume in such a way that (i) when the valve unit is switched into a first valve state, a shared pressure chamber pressure prevails in the first filling volume and in the second filling volume, and a brake application volume of a pressure chamber of the master brake cylinder includes at least the first filling volume and the second filling volume, to produce a first ratio of brake pressure provided by the pressure chamber to brake force exerted on at least one piston having the at least one first and second piston walls, and (ii) when the valve unit is switched into a second valve state, the brake application volume of the pressure chamber of the master brake cylinder includes at least the first filling volume and is separated from the second filling volume, to produce a second ratio of the brake pressure to the brake force, the second ratio being greater than the first ratio, wherein the valve unit is switched into the second valve state in response to a failure of the brake force booster device.

23. A method for operating a master brake cylinder, comprising:
setting a brake application volume of a pressure chamber of the master brake cylinder to a sum of (i) a first filling volume of the master brake cylinder for filling with liquid, wherein at least one dimension of the first filling volume is variable by adjusting at least one first piston wall, and (ii) a second filling volume of the master brake cylinder for filling with liquid, wherein at least one dimension of the second filling volume is varied by adjusting at least one second piston wall, by providing a first hydraulic connection between the first filling volume and the second filling volume and suppressing a second hydraulic connection between the second filling volume and a brake fluid reservoir, to produce a first ratio of brake pressure provided by the pressure chamber to brake force exerted on at least one piston having the at least one first and second piston walls; and
setting the brake application volume of the pressure chamber to the first filling volume by suppressing the first hydraulic connection between the first filling volume and the second filling volume and providing the second hydraulic connection between the second filling volume and the brake fluid reservoir, whereby the brake application volume of the pressure chamber is separated from the second filling volume, to produce a second ratio of the brake pressure to the brake force, the second ratio being greater than the first ratio, in response to a failure of a brake force booster device.

24. The method as recited in claim 23, wherein providing the first hydraulic connection includes switching a valve unit into a first valve state by energizing the valve unit, and suppressing the first hydraulic connection includes switching the valve unit into a second valve state by deenergizing the valve unit.

25. The method as recited in claim 23, wherein the at least one first and second piston walls face in a substantially same direction.

26. The method as recited in claim 23, wherein the at least one piston is a single stepped piston having a first piston section having a first diameter perpendicular to an adjustment direction of the piston and a second piston section having a second diameter perpendicular to the adjustment direction, the first diameter being smaller than the second diameter.

27. The method as recited in claim 23, wherein the at least one piston includes a first piston having the at least one first piston wall and a second piston having the at least one second piston wall.

28. The method as recited in claim 23, further comprising providing a sealing element to prevent passage of the liquid in the second filing volume to the first filing volume other than through the first hydraulic connection.

29. The method as recited in claim 23, wherein connecting the second filling volume to the brake fluid reservoir results in a reservoir pressure prevailing in the brake fluid reservoir being present in the second filling volume.

* * * * *